H. L. OPSAHL.
SELECTIVE MOUNT FOR CARDS OR PHOTOGRAPHS.
APPLICATION FILED APR. 26, 1920.

1,353,846.

Patented Sept. 28, 1920.

INVENTOR.
HARRY L. OPSAHL.
BY HIS ATTORNEYS
Williamson Merchant

H. L. OPSAHL.
SELECTIVE MOUNT FOR CARDS OR PHOTOGRAPHS.
APPLICATION FILED APR. 26, 1920.
1,353,846.
Patented Sept. 28, 1920.
2 SHEETS—SHEET 2.
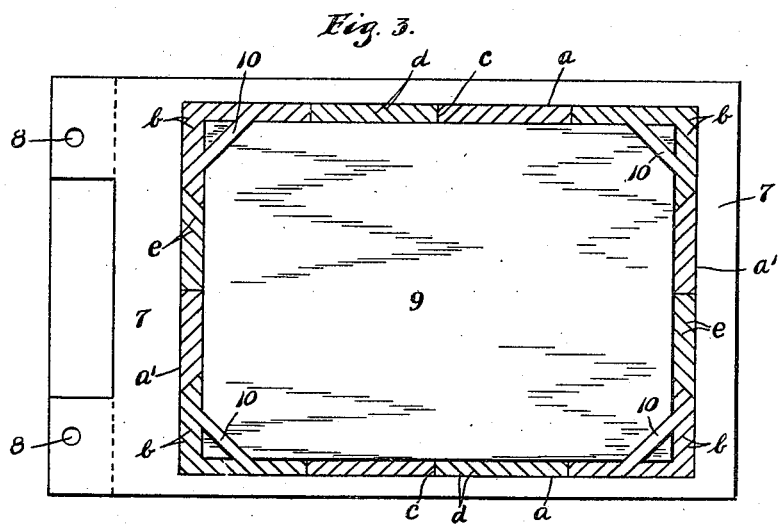
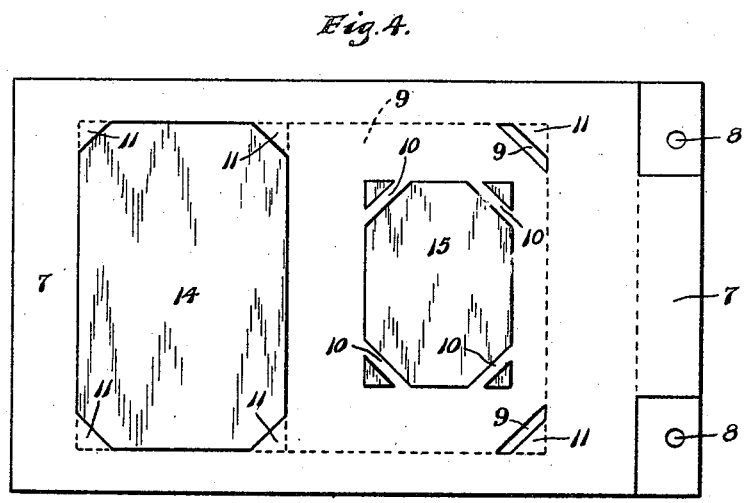
INVENTOR.
HARRY L. OPSAHL.
BY HIS ATTORNEYS.

UNITED STATES PATENT OFFICE.

HARRY L. OPSAHL, OF MINNEAPOLIS, MINNESOTA.

SELECTIVE MOUNT FOR CARDS OR PHOTOGRAPHS.

1,353,846.  Specification of Letters Patent.  Patented Sept. 28, 1920.

Application filed April 26, 1920. Serial No. 376,559.

*To all whom it may concern:*

Be it known that I, HARRY L. OPSAHL, a citizen of the United States, residing at Minneapolis, in the county of Hennepin and State of Minnesota, have invented certain new and useful Improvements in Selective Mounts for Cards or Photographs; and I do hereby declare the following to be a full, clear, and exact description of the invention, such as will enable others skilled in the art to which it appertains to make and use the same.

My invention has for its object to provide a selective mount for cards or photographs, and it is especially well adapted for the mounting of different sized photographs on both side of the loose leaves of albums or other folders; and, to this end, my invention consists of the novel devices and combinations of devices hereinafter described and pointed out in the claims.

The invention is illustrated in the accompanying drawings wherein like notations refer to like parts throughout the several views.

In said drawings,

Fig. 3 is a plan view of the leaf shown in Fig. 1, as it would appear, after a single large card had been mounted thereon in position to be securely held by retaining surfaces, secured by cutting the leaf in accordance with the form shown in Fig. 1;

Fig. 4 shows the opposite side of the same leaf shown in Fig. 3, with two cards of different size mounted thereon and securely held by retaining surfaces, secured by cutting the leaf in accordance with the form shown in Fig. 1;

Figure 1:
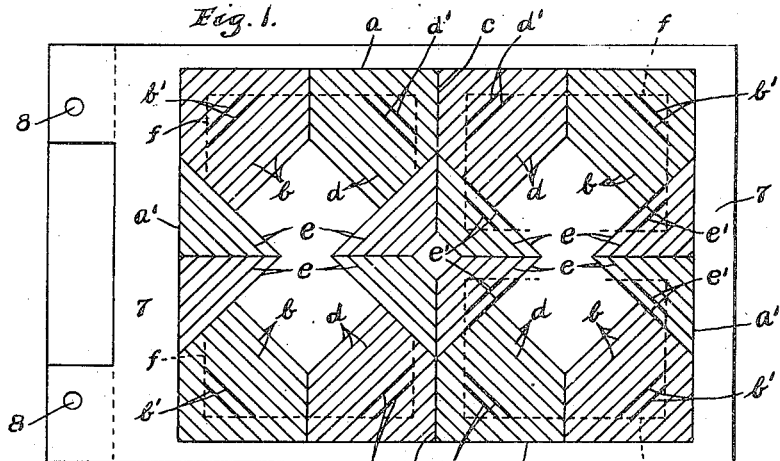
Figure 1 is a plan view of a rectangular loose leaf, of the kind suitable for albums, and which leaf has indicated thereon my cutting form.
Figure 5:
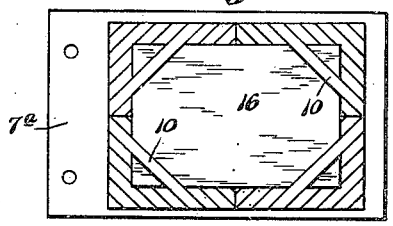
Figure 6:
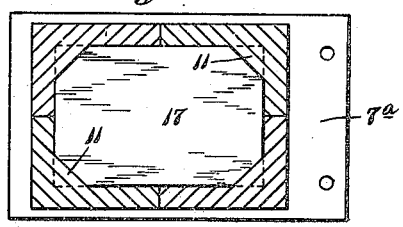
Figure 7:
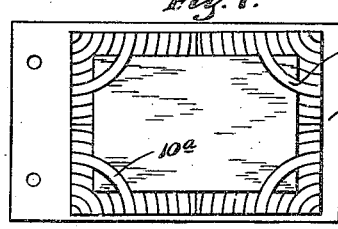

Figs. 5 and 6 show opposite sides of a small leaf in plan view, having cards mounted thereon, back to back, and held by retaining surfaces, secured by cutting the leaf in accordance with a smaller cutting form, of the same kind as illustrated in Fig. 1; and Fig. 7 is a plan view of a small sheet, similar to that shown in Figs. 5 and 6, but illustrating a slight modification in the cutting form, towit: where the cutting lines running across the corners of the rectangle take curved paths, instead of straight paths, as shown in the other views.

Referring to Figs. 1, 2, 3 and 4, the loose leaf 7 is of a single thickness or layer and is of rectangular form or outline, and shown as provided with holes 8 for binding into an album in the usual way. On one face of this loose leaf 7, I print, or otherwise indicate, the outline of a main rectangle, the sides of which are marked with the reference letter $a$ and the ends of which are marked with the reference letter $a'$; and which rectangle $a$—$a'$ is of a size to mount within the same the largest size of card or photograph within the predetermined limits. Then, across the corners of this rectangle, I print or indicate a series of suitably spaced parallel cutting lines $b$, shown as equally spaced apart from each other, but which might vary in spacing, increasing progressively outward toward the corners. Then, by lines $c$, I subdivide the main rectangle into four symmetrical smaller rectangles of equal size; then, across the central outer corners of these smaller rectangles, I place cutting lines $d$, and across their inner corners, I place cutting lines $e$. The cutting lines $b$, already provided for in the main or large rectangle, serve also for the outer corners of the small rectangles. When the cutting lines are thus applied to complete the cutting form, the form will serve to indicate the proper lines on which to cut through the leaf to get retaining surfaces for a wide variation in sizes of cards or photographs. For example, suppose the card to be mounted is of the size shown in Fig. 3 and there marked with the numeral 9; then, if that card be laid on the form shown in Fig. 1, with its margins parallel with the margins of the form and equally spaced from the same, its corner outlines may be lightly traced on the form by pencil, as shown by the dotted lines $f$ in Fig. 1, and these will mark off and include portions of a considerable number of the cutting lines $b$ extending across the corners of the main rectangle; and, then, any two of these may be selected, such as those shown by the heavy black lines $b'$, for the cuts to afford the retaining surfaces adapted to embrace the corners of the card. On one side of the sheet, these retaining surfaces, secured by cutting as above described, take the form of corner spanners 10, and, on the opposite side of the sheet, they take the form of corner fillers 11, as clearly shown in Fig. 4. After these cuts have been made, it is obvious that the card 9 may be mounted by simply placing its corners under the spanners 10, as shown in Fig. 3; and it should be equally obvious that, after the card 9 has been mounted on one side of the sheet, that another card, of the same size, could be mounted on the opposite side of the same sheet, by simply making its corners extend under the corner fillers 11, which result from the outermost of the two cuts used to get the corner spanners 10.

Assume again that it is desired to mount three cards on one side of the loose leaf 7, and, that one of these is of the size shown by the card 12, and that the other two are of the size shown by the cards 13; then, the card 12 can be laid on the left hand rectangle of the main diagram or cutting form, with its margins parallel with the margins of that rectangle and its corners again lightly traced with pencil so as to include portions of several of the cutting lines $b$ and several of the cutting lines $d$; then, any needed pair of these may be selected at each of the four corners to get the spanners 10 on one side and the corner fillers 11 on the other as before.

In a similar way, the smaller cards 13 would be placed on the small rectangles, at the right of Fig. 1, with their margins parallel with the margins of said small rectangles and their corners lightly traced in pencil, so as to include portions of several of the cutting lines extending across the corners of this small rectangle, and any desired pair $e'$ of these being selected and cut, will afford the corner spanners 10 on one side and the corner fillers 11 on the opposite side of the sheet; then, the corners of the cards 13 may be made to engage under the spanners 10 and the cards will be securely mounted and held. Cards, of precisely the same size and of precisely the same arrangement, could then be mounted on the opposite side of the same sheet with their corners embraced by the corner fillers 11, formed by one of the cuts made to get the spanners 10.

Figure 2:
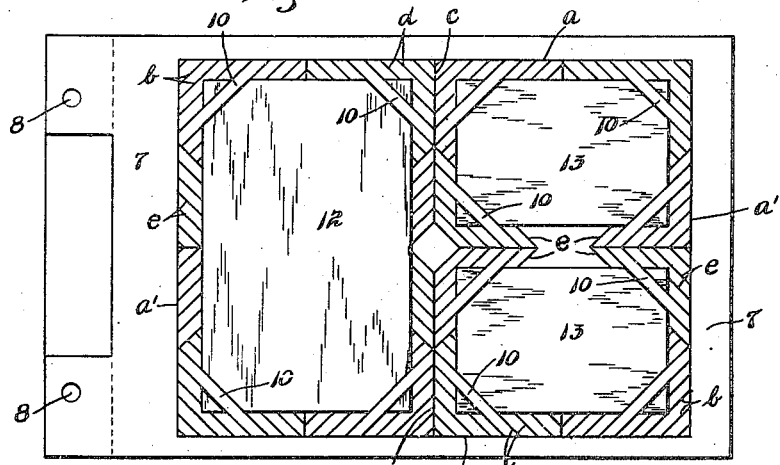
Fig. 2 is a similar view showing one side of the same leaf as it would appear after three cards, one comparatively large and the other two comparatively small, had been mounted there on in position to be securely held by retaining surfaces, secured by cutting the leaf in accordance with the form shown in Fig. 1.

It is not necessary, however, that the cards on the opposite sides should be of the same size and in symmetrical arrangement, but, on the contrary, they may be of different sizes and otherwise disposed, as shown in Fig. 4, where the card 14 is shown as of the same size as the card 12, but back to back thereto on the opposite side of the loose leaf 7, or back to back to one-half of the card 9, shown in Fig. 3, and where the card 15 is of a size smaller than any of the cards, shown in Fig. 2, and is so disposed, that it overlies the two small rectangles at the right of Fig. 1. Nevertheless, when such a card as the small one marked with the numeral 15 in Fig. 4, is properly applied to the diagram or cutting form, shown in Fig. 1, with its margins parallel with the margins of the rectangle selected, and equally spaced apart from corresponding margins thereof, and the corners thereof are traced in pencil on that form, the required cutting lines will be embraced among the number included by these pencil lines, and, when selected and cut, will afford the spanners 10 on one side and corner fillers 11 on the other, and these are obviously interchangeable in respect to the opposite sides of the loose leaf 7. In other words, the spanners 10 are raised from the level of the body of the leaf 7 on one side or the other, according to the individual's choice, and will leave the corner fillers on the opposite side.

Again calling attention to the cutting form or diagram, shown in Fig. 1, it may be seen that the cutting lines running across the corners of the main rectangle, and running across the corners of the half largest size of rectangles, are much more numerous than the cutting lines running across the inner corners of the smallest or quarter full size rectangles. The reason for this is that the larger sizes of cards or photographs will vary much more widely in size than the smaller sizes of cards or photographs. It is obvious that the limit of variation in the small size is very much less than in the large size.

In Figs. 5, 6 and 7, I have illustrated my invention as applied to a small or vest pocket size of album leaf $7^a$, where the leaf is so small that it is only suitable for mounting a single card or photograph on each of the opposite sides thereof, as shown by the cards 16 and 17 in Figs. 5 and 6, such, for example, as photographs from the smallest camera. These small cards or photographs, however, will vary considerably in the trimming; and hence, my selective mount is highly serviceable here as well as for the larger cards or photographs, illustrated in the other views. The principle is precisely the same and any further detailed description for these single card forms, shown in Figs. 5 and 6, is deemed unnecessary. Fig. 7 illustrates one of these small forms precisely the same as Figs. 5 and 6, but shows a slight modification in respect to the indicated lines for selective use in making the cuts to get the corner spanners and corner fillers. These cutting lines are shown here as extended across the corners as in the other views, but, instead of being on straight lines, they run on curves; and hence, would give spanners $10^a$ of corresponding curved form, and the corner filler, on the opposite side, instead of having a straight, would have a curved outline facing toward the center of the card.

From the foregoing, it must be obvious that, by my invention, I have provided a selective mount for cards or pictures of different size, and wherein the retaining surfaces will be afforded by portions of the loose leaf, itself, and wherein the cards or pictures may be set back to back on the opposite sides of the leaf, and thereby be made to brace each other and stiffen the leaf. Moreover, the cards or pictures being set back to back, especially in the case of pictures, warping or rolling will not occur, for the reason that the warping or rolling pull in one direction is offset or compensated for by the warping or rolling pull in the opposite direction. The leaves will always lie flat. It must be equally obvious that the corner spanners 10 or fillers 11 may be made of any desired size and strength, according to the need of the card or picture to be mounted.

All of the said advantageous features, taken together, coöperate to enable the most advantageous use of the loose leaves of the album or other folder and to insure the longest life thereof in service.

It is also obvious that the cards or pictures can be, at any time, taken out and rearranged, or others substituted for those taken out, without injury to the cards or pictures or the mounts for the same on the leaves.

Finally, everything is clean from start to finish. There is no paste or glue or stickers employed. There is no occasion to use any. This is a great gain of itself.

It will, of course, be understood that, while I have shown my invention as applied to a loose leaf sheet adapted to be bound into an album, it is equally applicable to any other form of sheet. For example, it might be a cardboard or folder or any form of independent sheet. It must also be understood that, when the sheet is itself of rectangular form, the margins of the sheet, itself, might serve as the outline of the main or large rectangle of the cutting form. It is usually desirable, however, to have the sheet of a little larger size than the large rectangle of the cutting form.

The cutting form can, of course, be printed or stamped on the sheet, and, if desired, the lines may be faint or in such neutral colors relative to the color of the sheet as not to detract from the appearance of the sheet.

By actual usage, I have demonstrated the practicability and utility of my invention herein disclosed and claimed.

What I claim is:

1. A selective mount for cards or pictures of different size, comprising a sheet having indicated thereon a cutting form composed of a rectangular outline and a plurality of uncut selective cutting lines running across the corners of said rectangle, thereby indicating the proper cuts, for securing retaining surfaces to embrace the corners of any desired size of card or picture, within the predetermined limits of variation, when the card or picture is laid on said form with its margins parallel with the margins of the form, substantially as described.

2. A selective mount for cards or pictures of different size, comprising a sheet affording a cutting form composed of a main rectangular outline having a plurality of cutting lines running across the corners thereof and subdivided into symmetrical smaller rectangles having cutting lines running across the corners thereof, thereby indicating the proper cuts for securing retaining surfaces to embrace the corners of any desired size of card or picture within the predetermined limits of a wide range of variation, when the card or picture is laid on said form with its margin parallel with either the main or smaller rectangular margins, substantially as described.

3. A selective multiple mount for cards or pictures of different size, set back to back, comprising a single layer sheet having indicated thereon a cutting form composed of a rectangular outline and a plurality of cutting lines running across the corners of said rectangle, thereby indicating the proper cuts for securing retaining surfaces on both sides of the sheet to embrace the corners of any desired sizes of cards or pictures, set back to back, on the opposite sides of the sheet, within the predetermined limits of variation, when the cards or pictures are laid on said form, with their margins parallel with the margins of the form, substantially as described.

4. A selective multiple mount for cards or pictures of different size, set back to back, comprising a single layer sheet affording a cutting form composed of a main rectangular outline having a plurality of cutting lines running across the corners thereof and subdivided into symmetrical smaller rectangles having cutting lines running across the corners thereof, thereby indicating the proper cuts for securing retaining surfaces on both sides of said sheet to embrace the corners of any desired sizes of cards or pictures, set back to back, on the opposite sides of the sheet, within the predetermined limits of variation, when the cards or pictures are laid on said form, with their margins parallel with the margins of the form, substantially as described.

In testimony whereof I affix my signature.

HARRY L. OPSAHL.